United States Patent
Keers et al.

(10) Patent No.: US 8,467,264 B2
(45) Date of Patent: Jun. 18, 2013

(54) ACQUIRING NEAR ZERO OFFSET SURVEY DATA

(75) Inventors: Henk Keers, Oslo (NO); Aslaug Stroemmen Melboe, Bekkestua (NO); Jon-Fredrik Hopperstad, Petersfield (GB); Johan O. A. Robertsson, Grantchester (GB); Ed Kragh, Finchingfield (GB); Morten Svendsen, Voyenenga (NO); Luren Yang, Oslo (NO); Svein Arne Frivik, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 874 days.

(21) Appl. No.: 12/132,592

(22) Filed: Jun. 3, 2008

(65) Prior Publication Data

US 2009/0296520 A1 Dec. 3, 2009

(51) Int. Cl.
*G01V 1/00* (2006.01)

(52) U.S. Cl.
USPC ............................... 367/20; 367/15; 367/154

(58) Field of Classification Search
USPC ........................................ 367/15–20
See application file for complete search history.

(56) References Cited

U.S. PATENT DOCUMENTS

| | | | |
|---|---|---|---|
| 4,693,336 A * | 9/1987 | Newman | 181/111 |
| 4,726,315 A * | 2/1988 | Bell et al. | 114/244 |
| 5,083,297 A | 1/1992 | Ostrander | |
| 5,461,594 A | 10/1995 | Mougenot et al. | |
| 5,973,995 A * | 10/1999 | Walker et al. | 367/20 |
| 5,982,706 A | 11/1999 | Byun | |
| 6,556,510 B2 * | 4/2003 | Ambs | 367/20 |
| 6,697,737 B2 * | 2/2004 | Jones et al. | 702/2 |
| 6,735,527 B1 * | 5/2004 | Levin | 702/14 |
| 7,321,526 B2 * | 1/2008 | Carvill et al. | 367/21 |
| 2009/0140741 A1 * | 6/2009 | Tenghamn et al. | 324/347 |

FOREIGN PATENT DOCUMENTS

| | | |
|---|---|---|
| GB | 2441344 | 3/2008 |
| WO | 9819181 | 5/1998 |
| WO | 2008032082 | 3/2008 |

OTHER PUBLICATIONS

Amundsen, L., Linear inversion for source signatures from ministreamer data, The Leading Edge, 19, 1, 2000, p. 40-43.
Landrø, M., Source signature determination by inversion of ministreamer data, The Leading Edge, 19, 1, 2000, p. 46-49.
PCT Search Report, dated Dec. 23, 2009, Application No. PCT/US2009/045270.
Examination Report of British Application Serial No. 1019198.9 dated Dec. 16, 2011.

\* cited by examiner

*Primary Examiner* — Isam Alsomiri
*Assistant Examiner* — Krystine Breier

(57) ABSTRACT

To acquire near-zero offset survey data, a survey source and a first streamer attached to the survey source are provided, where the first streamer has at least one survey receiver. A second streamer separate from the survey source and the first streamer includes survey receivers. Near-zero offset data is measured using the at least one survey receiver of the first streamer.

15 Claims, 2 Drawing Sheets

ACQUIRING NEAR ZERO OFFSET SURVEY DATA

TECHNICAL FIELD

The invention relates generally to acquiring near-zero offset survey data.

BACKGROUND

Surveying, including electromagnetic surveying or seismic surveying, is used to perform characterization of subterranean elements in a subterranean structure. Examples of subterranean elements of interest include hydrocarbon-bearing reservoirs, fresh water aquifers, gas injection zones, and other subterranean elements. Seismic surveying is performed by deploying seismic sources (e.g., air guns, vibrators, explosives, etc.) and seismic receivers (e.g., geophones, hydrophones, etc.). The seismic sources are used to produce seismic waves that are propagated into the subterranean structure, with some of the seismic waves reflected from subterranean elements of interest. The reflected seismic waves are received by the seismic receivers.

Similarly, electromagnetic (EM) surveying can use EM sources and receivers. One type of EM surveying is referred to as controlled source EM surveying (CSEM), in which an EM transmitter is used to generate EM signals that are propagated into the subterranean structure. Subterranean elements reflect the EM signals, with the reflected EM signals received by the EM receivers.

In a marine survey environment, survey hardware components (e.g., sources and receivers) can be towed through a body of water. To avoid interference from noise at the marine vessel that is towing the survey hardware components, the survey receivers on a streamer are typically located some minimum distance from the marine vessel. However, the survey sources are usually towed relatively close to the marine vessel to avoid possible entanglement issues between the towed source and receiver streamers. As a result, typical distances, in the in-line direction (which is the direction of movement of the marine vessel), is typically 50 to 200 meters away from the closest survey receiver of a streamer. Other reasons for towing a source close to the marine vessel is that a power cable that is used to power a source (such as a power cable to pump air to an air gun) may have a predefined maximum length. Also, the receivers are towed far away from the vessel so that vessel related noise (engine, crew, wake, etc.) is negligible.

The relatively large separation of survey source and survey receivers prevents measurements of a zero-offset or near-zero offset survey image. This can lead to reduced accuracy in processing of the survey data.

SUMMARY

In general, according to an embodiment, a method is provided to acquire near-zero offset survey data. The method includes providing a survey source and a first streamer attached to the survey source, where the first streamer has at least one survey receiver. Moreover, a second streamer, separate from the source and the first streamer attached to the source, is provided. Near-zero offset measurement can be made at the survey receiver of the first streamer attached to the source.

Other or alternative features will become apparent from the following description, from the drawings, and from the claims.

DETAILED DESCRIPTION

Figure 1:
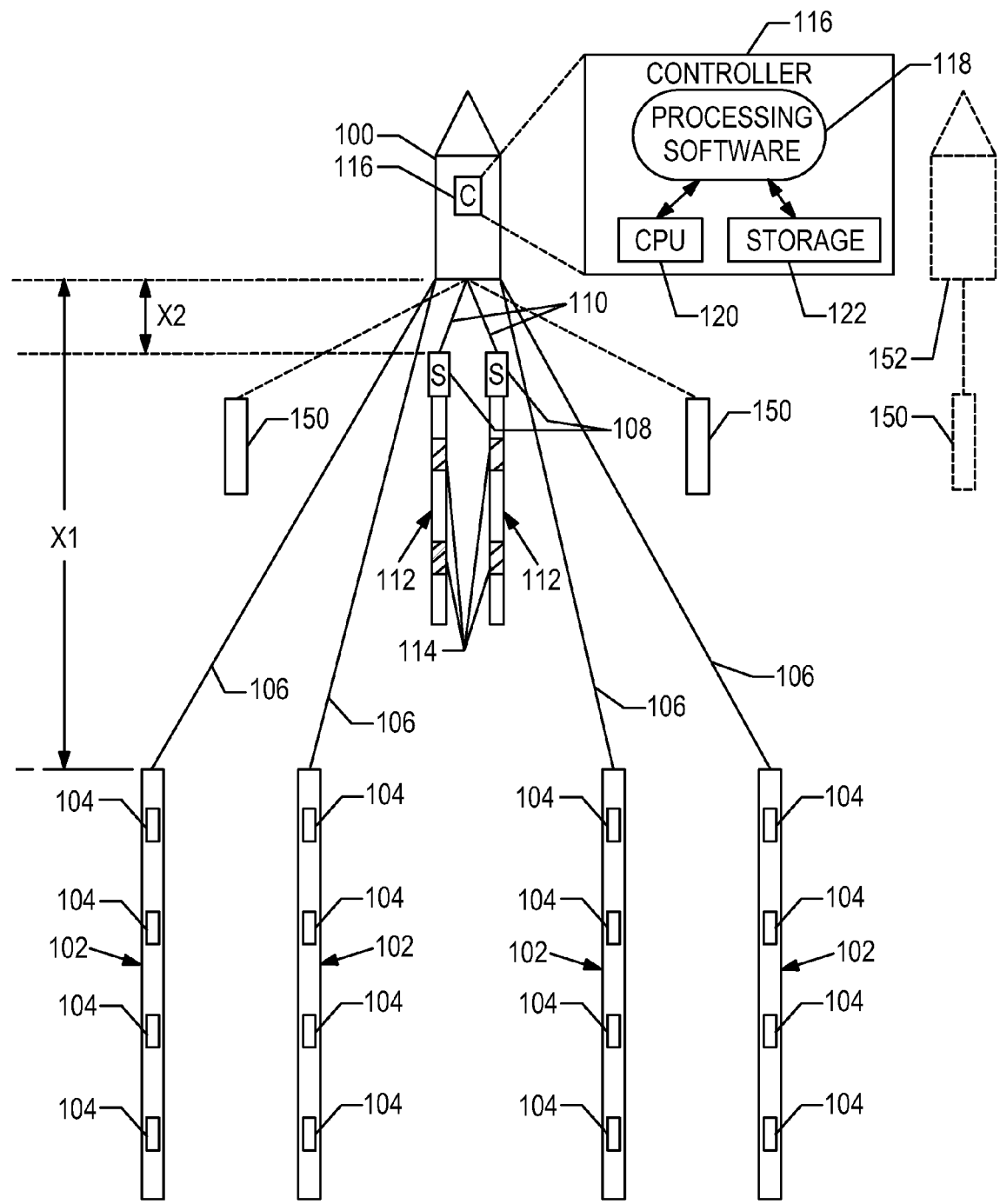
FIG. 1 illustrates an example marine survey arrangement including a marine vessel that tows seismic sources, mini-streamers attached to the seismic sources according to an embodiment, and main streamers.

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a marine survey arrangement includes towing a survey source and a mini-streamer attached to the survey source, where the mini-streamer includes at least one survey receiver. Moreover, a main streamer is also towed by the marine vessel, where the main streamer is separate from the source and the mini-streamer. The at least one survey receiver of the mini-streamer is able to make near-zero offset measurements, which can be used in survey data processing to improve accuracy. Alternatively, more than one survey source, mini-streamer, and/or main streamer can be provided.

The term "mini-streamer" refers to a streamer that contains one or more survey receivers used for the purpose of acquiring near-zero offset survey data. A "main streamer" refers to a streamer including survey receivers for acquiring measurement data during a survey operation. A "streamer" refers to a structure that is used to carry survey receiver(s) through a body of water. In addition, a "streamer" is also intended to encompass a cable.

The term "near-zero offset measurement" refers to a measurement of survey data made at a survey receiver that is closer to the source than any of the survey receivers on the main streamer. The term "near-zero offset measurement" can refer to either a zero offset measurement, where the survey receiver is located at the same in-line position as the survey source, or a near-zero offset measurement, where the survey receiver is separated by some offset (either in the in-line direction or cross-line direction or both) by some distance that is less than the distance between the survey source and the closest survey receiver of the main streamer. The in-line direction refers to the direction of movement of the marine vessel towing the survey source(s) and survey receivers. The cross-line direction refers to a direction (in a horizontal plane) that is generally perpendicular to the in-line direction.

The concept of near-zero offset can be based on the bin size of the main streamer. The size of an output bin is the spatial interval along the main streamer for which survey measurements are made. For example, the output bin size can be 12.5 meters or 25 meters, which means that measurements along the main streamer are made every 12.5 meters or 25 meters. Note that the survey receivers of the main streamer can actually be located closer together, such as 3 meters apart.

In the digital context, the individual measurements from the survey receivers contained in each output bin are individually provided for processing. In the analog context, the measurement data from multiple survey receivers in each output bin are hardwired together to perform summation, with the measurement data based on the summation output for processing.

The digital approach has the benefit that measurement data from the survey receivers close to the marine vessel can be processed to remove noise. Another approach of removing noise or reducing noise is to tow the mini-streamer at a deeper depth than the survey source and main streamer.

In some cases, the mini-streamer can have multiple survey receivers. The closest survey receiver on the mini-streamer to the survey source in the in-line direction can be quite close, such as less than or equal to 10 meters. The farthest survey receiver on the mini-streamer to the survey source can be spaced apart by a distance that is the same as or almost the same as the closest receiver of the main streamer. In other implementations, some gap can be provided between the furthest survey receiver on the mini-streamer and the closest survey receiver of the main streamer. In the latter case, extrapolation of data from both the mini-streamer and main streamer would have to be performed to provide measurement data in this gap.

FIG. 1 shows an example arrangement in which a marine vessel 100 tows a number of main streamers 102, where each main streamer 102 carries survey receivers 104. The survey receivers can be seismic receivers (e.g., geophones, hydrophones, etc.) or electromagnetic (EM) receivers that have EM elements to measure electric and/or magnetic fields.

As depicted in FIG. 1, the main streamers 102 are towed by tow lines 106, and the closest end of each main streamer 102 is spaced apart (in the in-line direction) by some in-line offset X1 from the rear of the marine vessel 100. Note that not all the main streamers 102 have to be spaced apart by the same in-line offset X1. In alternative implementations, at least one of the main streamers 102 can be towed by a different in-line offset behind the marine vessel 100.

Also depicted in FIG. 1 are survey sources 108 attached to tow lines 110 so that the survey sources 108 are towed by the marine vessel 100. As depicted, the survey sources are separated by a closer in-line offset X2 (X2<X1) than the main streamers 102. The survey sources 108 can be seismic sources or EM sources.

In accordance with some embodiments, mini-streamers 112 are attached to corresponding survey sources 108. These mini-streamers 112 are separate from the main streamers 102, as depicted. Each mini-streamer 112 can have one or multiple survey receivers 114. Note also that the mini-streamers 112 are also separate from the survey sources 108. In other words, each mini-streamer includes one or more survey receivers mounted on a carrier structure that is separate from the carrier structure of the respective survey source (which can have an array of survey source elements).

As shown, the distance of the closest survey receiver 114 on the mini-streamer 112 to the corresponding survey source 108 is much smaller than the distance between the survey source 108 and the closest survey receiver 104 of any of the main streamers 102.

FIG. 1 further depicts that the marine vessel 100 has a controller 116 that can be used to process measured data from the survey receivers 114 of the mini-streamers 112, as well as from the survey receivers 104 of the main streamers 102. The measured data can be provided over communications links from the survey receivers 104, 114 to the controller 116. Alternatively, the survey receivers 104, 114 can store the measured data for later retrieval to process.

The controller 116 can be a computer that has processing software 118 executable on one or more central processing units (CPUs) 120. The CPU(s) is (are) connected to a storage 122 of the controller 116.

In alternative implementations, instead of providing the controller 116 on the marine vessel 100, the controller 116 can be a provided at a remote location, such as on another marine vessel or on land.

Although two mini-streamers 112 and four main streamers 102 are depicted in the example arrangement of FIG. 1, note that alternative implementations can use different numbers of the mini-streamers 112 and main streamers 102. For example, just one mini-streamer 112 or just one main streamer 102 can be used. In alternative implementations, any combinations of numbers of mini-streamers and main streamers can be used.

Various types of survey data algorithms can benefit from the near-zero offset measurements made by the survey receivers of the mini-streamers. For example, such data processing algorithms can include algorithms to perform multiple attenuations. In acquiring survey data, signal reflection can occur due to the water surface, where these reflections (referred to as multiples) can interfere with accurate processing of the measured survey data. Algorithms to perform multiple attenuation can include two-dimensional or three-dimensional surface-related multiple estimation (SRME) algorithms; a multiple attenuation algorithm with a Radon transform; an extrapolation algorithm; a migration velocity analysis algorithm; an imaging algorithm; inversion algorithms, such as AVO; and so forth.

The near-zero offset measurement data can also be applied to future data processing workflows that can include algorithms such as direct inversion and waveform inversion.

An example of how the mini-streamer measurement data can improve the output of a data processing algorithm, such as a two-dimensional SRME algorithm, is provided below.

In 2D SRME, surface multiples are predicted from the data by convolving the recorded data with itself. The predicted surface multiples are then subtracted from the data. The resulting data, with the surface multiples removed, can then be used in velocity analysis and imaging. The mathematical expression for 2D SRME is:

$$d_M(s_x, r_x, t) = \int_{x_{min}}^{x_{max}} d(s_x, x, t) * d(x, r_x, t) dx \qquad (Eq.\ 1)$$

where t denotes time, x is the in-line coordinate, $s_x$ is the in-line (or x-) coordinate of the source, $r_x$ is the in-line coordinate of the receiver, d denotes the data, $d_M$ is the predicted surface multiple, * denotes convolution with respect to time, and $x_{min}$ and $x_{max}$ are respectively the minimum and maximum integration coordinates. Eq. 1 expresses that the surface multiples $d_M$ at receiver $r_x$ as caused by a source at $s_x$ can be computed by convolving data recorded at the source and receiver locations and integrating the convolved data over the x coordinate. Since this is a 2D problem, the y-coordinates do not exist; the z-coordinates are assumed to be zero; if necessary wavefield extrapolation has been applied to achieve this.

The near-zero offset data, corresponding to x around zero (note that $r_x-s_x$ is close to zero, $x_{min}<0$, and $x_{max}>0$) typically are not available in conventional acquisition and thus a gap exists in the integration domain. Conventionally, this gap can be filled by extrapolating the measured data, using, for example, differential moveout equations. However, this is not very accurate.

According to some embodiments, the near-zero offset measurement data as measured by the mini-streamer can be used. In this manner, all, or almost all, data required to compute the integral in Eq. 1 are available and the multiple prediction will be correct and not affected by possible artifacts because of the missing near-offset measurement data.

Figure 2:
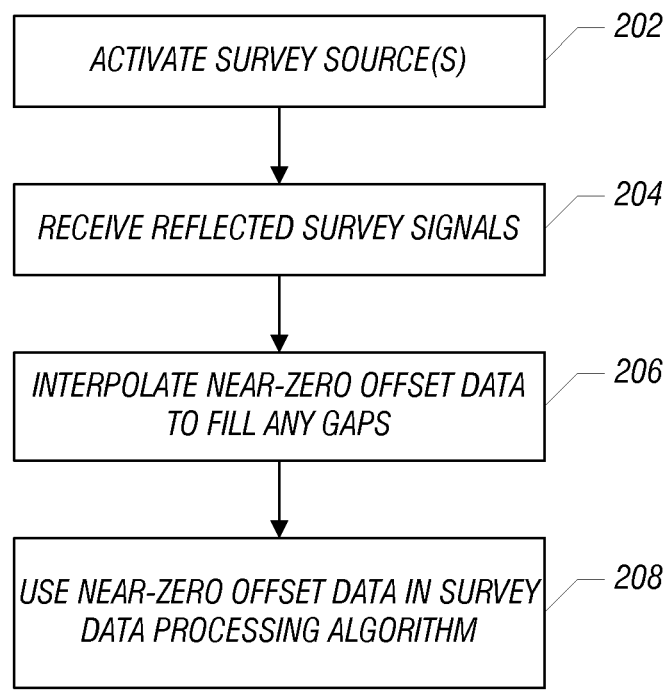
FIG. 2 is a flow diagram of a process of determining and using near-zero offset measurement data, according to an embodiment.

FIG. 2 shows an example flow diagram of a process according to an embodiment. Note that the process of FIG. 2 can be performed under control of the controller 116 of FIG. 1. In operation, a survey source (or multiple survey sources) is (are) activated (at 202) to produce survey signals that are directed into a subterranean structure underneath a sea floor. Portions of the survey signals are reflected by subterranean elements of the subterranean structure with the reflected survey signals received (at 204) by the mini-streamer survey receivers and main streamer survey receivers. The survey signals can be seismic signals (e.g., acoustic signals) or EM signals.

The received survey measurement data from the mini-streamer survey receivers constitutes the near-zero offset data (or part of the near-zero offset data). If necessary, the processing software can interpolate (at 206) the mini-streamer near-zero offset survey data to fill any gap (in the in-line direction) between the survey receivers of the mini-streamer and survey receivers of the main streamers. The near-zero offset survey data is then used (at 208) in a survey data processing algorithm, which can be a multiple attenuation algorithm such as those mentioned above.

The mini-streamer can be any type of streamer, including kerosene-filled streamer, gel-filled streamer, or solid streamer. Also, the length of the mini-streamer can vary. Example lengths can be lengths between 100 and 200 meters. The mini-streamers can also be equipped with steering tools, such as steering birds, and positioning equipment (including a high frequency source in the mini-streamer). The positioning system can be tied with the positioning system of the survey source, as well as that of the main streamer to enhance accuracy of relative positioning of the mini-streamer.

The mini-streamer(s) can be used in any type of seismic acquisition: traditional narrow azimuth acquisition, such as depicted in FIG. 1, or wide-azimuth and rich-azimuth acquisition. Wide-azimuth and rich-azimuth acquisitions would involve multiple marine vessels, where some of these vessels can tow just survey sources, in which case it would be advantageous to attach the mini-streamers to such sources. The mini-streamers can also be used in coil shooting. Coil shooting involves a source vessel (and therefore the streamers) traveling on a track of concentric circles, or coils, rather than on traditional straight line tracks. Coil shooting allows for acquisition of data from all azimuths (arrival angles) while using a single vessel and otherwise conventional acquisition configuration (the circle diameters are large enough to ensure that conventional configurations are not compromised.

The mini-streamers can be used with conventional survey sources. However, the mini-streamers can also be used with other types of source configurations, such as over-under sources. Finally, the mini-streamers can be utilized in over-under acquisition.

In situations where just one mini-streamer is used, zero-offset or near-zero offset measurement can be made, but only in the in-line direction and not cross-line direction. If two mini-streamers are used, then some small amount of cross-line measurement can be made, where the signals due to the source of a first mini-streamer are detected by survey receivers on a second mini-streamer that is spaced apart by some distance from the first mini-streamer in the cross-line direction.

Additionally, for enhanced cross-line measurements, it is possible to tow more mini-streamers at other cross-line offsets with respect to the survey source. For example, as depicted in FIG. 1, additional mini-streamers 150 can be positioned a relatively large distance away (in the cross-line direction) from the seismic sources 108. Instead of being towed by the same marine vessel 100, the additional mini-streamers 150 can be towed by at least one other marine vessel (152 in FIG. 1).

Instructions of software described above (including processing software 118 of FIG. 1) are loaded for execution on a processor (such as one or more CPUs 120 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method to acquire near-zero offset survey data, comprising:

towing, by a first marine vessel, a first survey source and a first streamer attached to the first survey source, wherein the first streamer has at least one survey receiver, and wherein the at least one survey receiver is in-line with the first survey source;

towing, by the first marine vessel, a second streamer that has survey receivers, the second streamer separate from the first survey source and first streamer, wherein the first survey source is spaced apart, in an in-line direction, from a closest survey receiver of the second streamer by a first distance, and wherein the first survey source is spaced apart, in the in-line direction, from the at least one survey receiver of the first streamer by a second distance less than the first distance;

measuring near-zero offset data using the at least one survey receiver of the first streamer;

providing a second survey source and a third streamer attached to the second survey source, the third streamer having at least one survey receiver, and wherein the at least one survey receiver of the third streamer is in-line with the second survey source such that no cross-line gap exists between the at least one survey receiver of the third streamer and the second survey source, and wherein the second survey source and the third streamer are spaced apart in a cross-line direction from the first survey source and the first streamer;

measuring near-zero offset data using the at least one survey receiver of the third streamer; and measuring cross-line data wherein the at least one survey receiver of the third streamer measures signaling produced by the first survey source.

2. The method of claim 1, wherein the second distance is less than 50 meters, and wherein the first distance is greater than or equal to 50 meters.

3. The method of claim 1, wherein towing the first survey source and the first streamer having the at least one survey receiver comprises towing a seismic source and the first streamer having at least one seismic receiver.

4. The method of claim 1, wherein towing the first survey source and the first streamer having the at least one survey receiver comprises towing an electromagnetic (EM) source and the first streamer having at least one EM receiver.

5. The method of claim 1, wherein towing the first streamer comprises towing the first streamer having a length smaller than a length of the second streamer.

6. The method of claim 1, further comprising using the near-zero offset data measured by the at least one survey receiver of the first streamer and near-zero offset data measured by the at least one survey receiver of the third streamer in an algorithm to perform multiple attenuation.

7. The method of claim 6, wherein using the near-zero offset data measured by the at least one survey receiver of the first streamer and near-zero offset data measured by the at least one survey receiver of the third streamer in the algorithm comprises using the near-zero offset data in a surface-related multiple estimation algorithm.

8. The method of claim 1, wherein towing the first survey source and the first streamer comprises towing separate structures.

9. The method of claim 1, wherein the at least one survey receiver of the first streamer and the first survey source are provided without any cross-line gap between the first survey source and the at least one survey receiver of the first streamer.

10. The method of claim 9, further comprising configuring the second streamer without any survey source.

11. The method of claim 1, wherein towing the first survey source and the first streamer having the at least one survey receiver comprises towing the first survey source and the first streamer on a single tow line that extends in an in-line direction.

12. The method of claim 11, further comprising configuring the second streamer without any survey source.

13. The method of claim 1, wherein providing the second survey source and the third streamer comprises towing the second survey source and the third streamer by the first marine vessel.

14. The method of claim 1, wherein providing the second survey source and the third streamer comprises towing the second survey source and the third streamer by a second marine vessel.

15. The method of claim 1, wherein the second survey source is spaced apart, in the in-line direction, from a closest survey receiver of the second streamer by a third distance, and wherein the second survey source is spaced apart, in the in-line direction, from the at least one survey receiver of the third streamer by a fourth distance less than the third distance.

* * * * *